United States Patent
Zulch, III et al.

(10) Patent No.: US 10,951,303 B2
(45) Date of Patent: *Mar. 16, 2021

(54) SYSTEM FOR PREVENTING UNAUTHORIZED ACCESS TO OPERATIONAL AIRCRAFT DATA

(71) Applicant: Honeywell International Inc., Morris Plains, NJ (US)

(72) Inventors: Harold Anthony Zulch, III, Phoenix, AZ (US); Thomas D. Judd, Woodinville, WA (US); Stephen Otis Hickman, Indianola, WA (US)

(73) Assignee: Honeywell International Inc., Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/691,129

(22) Filed: Nov. 21, 2019

(65) Prior Publication Data

US 2020/0112361 A1 Apr. 9, 2020

Related U.S. Application Data

(60) Continuation of application No. 14/463,488, filed on Aug. 19, 2014, now Pat. No. 10,523,309, which is a
(Continued)

(51) Int. Cl.
*H04B 7/185* (2006.01)
*H04W 12/00* (2021.01)
(Continued)

(52) U.S. Cl.
CPC ......... *H04B 7/18506* (2013.01); *H04L 63/06* (2013.01); *H04L 63/10* (2013.01);
(Continued)

(58) Field of Classification Search
CPC ......... H04L 67/10; H04L 67/12; H04L 12/14; H04L 43/50; H04L 29/06; H04L 45/00;
(Continued)

(56) References Cited

U.S. PATENT DOCUMENTS

| 6,154,636 | A | 11/2000 | Wright et al. |
| 7,512,714 | B2 | 3/2009 | Eckert |

(Continued)

FOREIGN PATENT DOCUMENTS

| CN | 101517982 A | 8/2009 |
| CN | 101652634 A | 2/2010 |

(Continued)

OTHER PUBLICATIONS

"About G3CARS", "http://www.g3cars.com/about.html accessed Dec. 14, 2011", pp. 1-2.

(Continued)

*Primary Examiner* — Michael A Keller
*Assistant Examiner* — Thao D Duong
(74) *Attorney, Agent, or Firm* — Fogg & Powers LLC

(57) ABSTRACT

In one example, a system for a preventing unauthorized access to operational aircraft data is provided. The system includes a server configured to be positioned on an aircraft. The server configured to communicate with a portable electronic device and a plurality of aircraft systems, wherein the server is configured to unidirectionally communicate with the plurality of aircraft systems, wherein the server is configured to receive avionic operational data from the plurality of aircraft systems. The server is further configured to implement security measures to prevent unauthorized electronic devices from accessing the avionic operational data produced by the plurality of aircraft systems. The server is further configured to control dissemination of avionic operational data to electronic devices.

20 Claims, 4 Drawing Sheets

Related U.S. Application Data division of application No. 13/409,616, filed on Mar. 1, 2012, now Pat. No. 9,571,181.

(51) Int. Cl.

| | | |
|---|---|---|
| *H04L 29/06* | (2006.01) | |
| *H04L 29/08* | (2006.01) | |
| *H04W 12/04* | (2021.01) | |
| *H04W 12/08* | (2021.01) | |

(52) U.S. Cl.
CPC .......... *H04L 67/12* (2013.01); *H04W 12/001* (2019.01); *H04W 12/04* (2013.01); *H04L 63/0272* (2013.01); *H04W 12/08* (2013.01)

(58) Field of Classification Search
CPC ....... H04L 63/102; H04L 67/06; H04L 67/02; H04L 12/1403; H04L 12/1428; H04L 12/1439; H04L 12/1446
See application file for complete search history.

(56) References Cited

U.S. PATENT DOCUMENTS

| | | | |
|---|---|---|---|
| 7,729,263 | B2 | 6/2010 | True et al. |
| 8,433,475 | B2 | 4/2013 | Corbefin |
| 8,935,306 | B2 | 1/2015 | Corbefin |
| 9,571,181 | B2 | 2/2017 | Zulch, III et al. |
| 10,523,309 | B2 | 12/2019 | Zulch, III et al. |
| 2002/0111720 | A1 | 8/2002 | Holst et al. |
| 2003/0003872 | A1 | 1/2003 | Brinkley et al. |
| 2003/0069015 | A1* | 4/2003 | Brinkley ................. H04L 67/04 455/431 |
| 2004/0106404 | A1* | 6/2004 | Gould ....................... G06F 8/65 455/431 |
| 2004/0162648 | A1 | 8/2004 | Bontrager et al. |
| 2005/0267860 | A1 | 12/2005 | Benguigui |
| 2006/0085308 | A1 | 4/2006 | Metzger |
| 2007/0294149 | A1 | 12/2007 | Lu et al. |
| 2008/0195861 | A1 | 8/2008 | Salomone |
| 2009/0058682 | A1 | 3/2009 | True |
| 2009/0133112 | A1 | 5/2009 | Kauffman et al. |
| 2009/0254605 | A1 | 10/2009 | Clavel |
| 2009/0310530 | A1 | 12/2009 | Cerra, II et al. |
| 2010/0121938 | A1 | 5/2010 | Saugnac |
| 2010/0131149 | A1* | 5/2010 | Saugnac ................. G07C 5/008 701/31.4 |
| 2012/0265372 | A1 | 10/2012 | Hedrick |
| 2012/0321087 | A1 | 12/2012 | Fleischman et al. |

FOREIGN PATENT DOCUMENTS

| | | |
|---|---|---|
| CN | 101663842 A | 3/2010 |
| CN | 101675646 A | 3/2010 |
| FR | 2914802 A1 | 10/2008 |
| WO | 2009058751 A2 | 5/2009 |
| WO | 2013013243 A1 | 1/2013 |

OTHER PUBLICATIONS

European Patent Office, "Communication pursuant to Article 94(3) from EP Application No. 13156476.7", from Foreign Counterpart to U.S. Appl. No. 13/409,616, dated Feb. 14, 2017, pp. 1-4, Published: EP.
European Patent Office, "Extended European Search Report from EP Application No. 13156476.7", from Foreign Counterpart to U.S. Appl. No. 13/409,616, dated May 31, 2013, pp. 1-6, Published: EP.
State Intellectual Property Office, "First Office Action from CN Application No. 201310163059.8", from Foreign Counterpart to U.S. Appl. No. 13/409,616, dated Mar. 30, 2017, pp. 1-20, Published: CN.
U.S. Patent and Trademark Office, "Advisory Action", U.S. Appl. No. 13/409,616, dated Apr. 30, 2015, pp. 1-8, Published: US.
U.S. Patent and Trademark Office, "Advisory Action", U.S. Appl. No. 14/463,488, dated Jan. 5, 2017, pp. 1-7, Published: US.
U.S. Patent and Trademark Office, "Advisory Action", U.S. Appl. No. 14/463,488, dated Nov. 20, 2017, pp. 1-8, Published: US.
U.S. Patent and Trademark Office, "Decision on Appeal", U.S. Appl. No. 14/463,488, dated Jul. 29, 2019, pp. 1-6, Published: US.
U.S. Patent and Trademark Office, "Final Office Action", U.S. Appl. No. 13/409,616, dated Dec. 18, 2014, pp. 1-19, Published: US.
U.S. Patent and Trademark Office, "Final Office Action", U.S. Appl. No. 14/463,488, dated Jul. 28. 2017, pp. 1-23, Published: US.
U.S. Patent and Trademark Office, "Final Office Action", U.S. Appl. No. 14/463,488, dated Oct. 6, 2016, pp. 1-17, Published: US.
U.S. Patent and Trademark Office, "Notice of Allowance", U.S. Appl. No. 13/409,616, dated Oct. 17, 2016, pp. 1-21, Published: US.
U.S. Patent and Trademark Office, "Notice of Allowance", U.S. Appl. No. 14/463,488, dated Aug. 21, 2019, pp. 1-7, Published: US.
U.S. Patent and Trademark Office, "Office Action", U.S. Appl. No. 13/409,616, dated Mar. 25, 2016, pp. 1-20, Published: US.
U.S. Patent and Trademark Office, "Office Action", U.S. Appl. No. 13/409,616, dated Aug. 4, 2014, pp. 1-28, Published: US.
U.S. Patent and Trademark Office, "Office Action", U.S. Appl. No. 14/463,488, dated Jan. 26, 2017, pp. 1-11, Published: US.
U.S. Patent and Trademark Office, "Office Action", U.S. Appl. No. 14/463,488, dated Mar. 24, 2016, pp. 1-21, Published: US.
U.S. Patent and Trademark Office, Examiner's Answer, U.S. Appl. No. 14/463,488, dated May 23, 2018, pp. 1-9, Published: US.
National Intellectual Property Administration, P.R. China, "First Office Action from CN Application No. 201810144819.3", from Foreign Counterpart to U.S. Appl. No. 13/409,616, dated Mar. 24, 2020, pp. 1 through 18, Published: CN.
National Intellectual Property Administration, P.R. China, "Second Office Action from CN Application No. 201810144819.3", from Foreign Counterpart to U.S. Appl. No. 13/409,616, dated Sep. 18, 2020, pp. 1 through 13, Published: CN.

* cited by examiner

SYSTEM FOR PREVENTING UNAUTHORIZED ACCESS TO OPERATIONAL AIRCRAFT DATA

CROSS-REFERENCE TO RELATED APPLICATIONS

This application is a continuation of U.S. application Ser. No. 14/463,488, filed on Aug. 19, 2014, entitled "SYSTEM FOR PREVENTING UNAUTHORIZED ACCESS TO OPERATIONAL AIRCRAFT DATA," which is a divisional of U.S. application Ser. No. 13/409,616 filed on Mar. 1, 2012, entitled "PROGRAMMABLE PORTABLE ELECTRONIC DEVICE FOR AIRBORNE OPERATIONAL COMMUNICATIONS," the disclosure of all of which are hereby incorporated by reference.

BACKGROUND

Aircraft operators and pilots use avionic operational data and operational communication to improve the efficiency of aircraft fleet operations. Typically, during the flight of an airplane, aircraft systems produce avionic operational data that is available for display to a pilot on cockpit displays and communicated as airborne operational communications (AOC) to a fleet control center over existing aerospace networks like an aircraft communications addressing and reporting system (ACARS) network. However, while operators are able to define AOC using configurable databases, the access of avionic operational data for the AOC is limited by ACARS datalink communication. For example, ACARS is an ASCII network and the transmission and receipt of the avionic operational data over a network like ACARS is restricted in bandwidth and as to types of messaging, format, size, and capabilities. Further, access to the avionic operational data is limited to cockpit instrumentation.

SUMMARY

The embodiments of the present disclosure provide systems and methods for a programmable portable electronic device for airborne operational communications and will be understood by reading and studying the following specification.

Embodiments of the present invention provide improved systems and methods for a programmable portable electronic device for airborne operational communications. In one embodiment, a system for preventing unauthorized access to operational aircraft data comprises a personal electronic device and a plurality of aircraft systems that produce avionic operational data. The system further comprises an airborne server in network communication with the personal electronic device and the plurality of aircraft systems, wherein the airborne server implements security measures to prevent unauthorized electronic devices from accessing the avionic operational data, wherein the airborne server controls the dissemination of avionic operational data to electronic devices.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
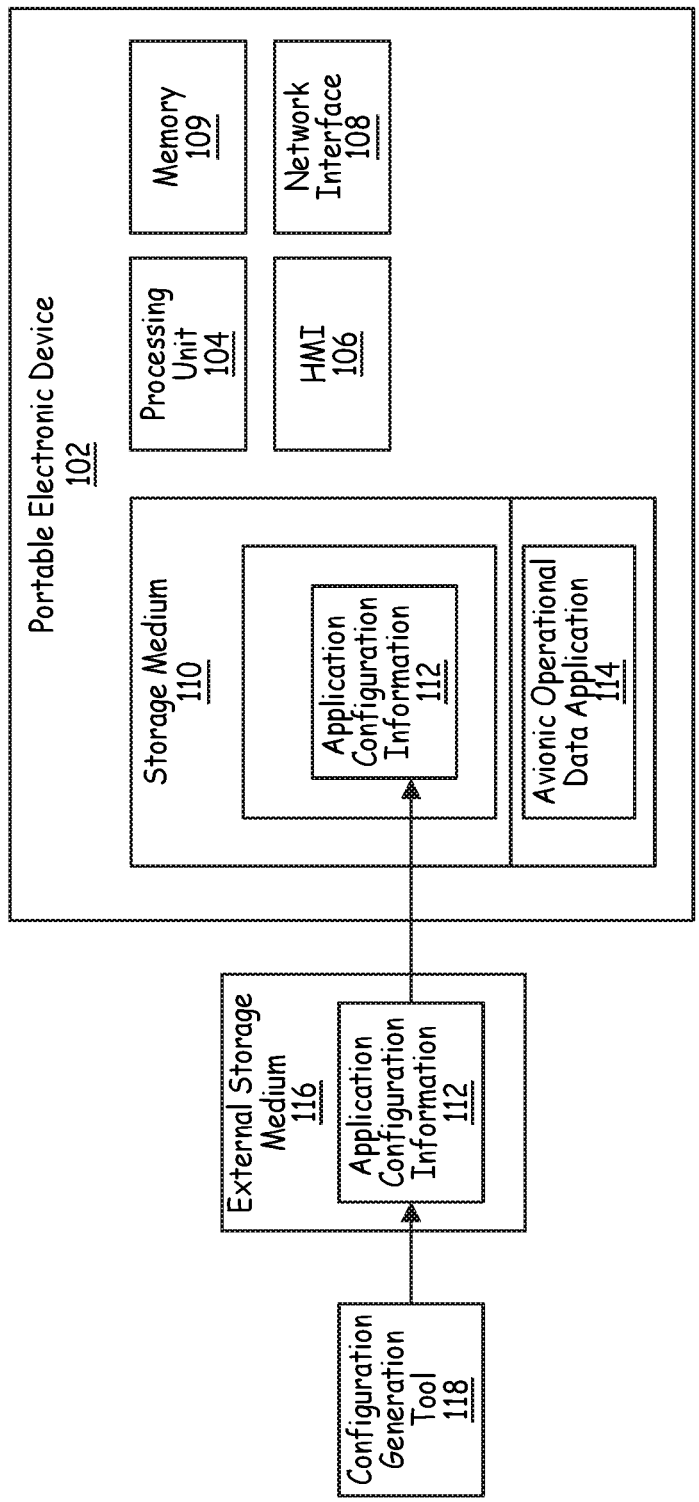
FIG. 1 is a block diagram of an exemplary embodiment of a programmable portable electronic device for airborne operational communications.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustrating specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

FIG. 1 is a block diagram of an exemplary embodiment of a portable electronic device (PED) 102 that is configured for operational communications. PED 102 includes tablet computers, laptop computers, personal digital assistants, smart phones, and the like. In the exemplary embodiments of the present disclosure, PED 102 is configured to provide a configurable avionic operational data communications application 114. Avionic operational data communications application 114 is an application that can be configured according to design requirements to control operational communications. In at least one embodiment, operational communications include processed avionic operational data that is communicated from an aircraft to a fleet control center to support fleet operation. In a further embodiment, avionic operational data communications application 114 allows a pilot to access avionic operational data through PED 102 that includes operation communications.

In the exemplary embodiment shown in FIG. 1, avionic operational data communications application 114 is stored (or otherwise embodied) on or in an appropriate non-transitory storage medium or media 110 (such as flash or other non-volatile memory, magnetic disc drives, and/or optical disc drives). At least a portion of the program instructions for avionic operational data communications application 114 are read from the storage medium 110 by a processing unit 104 for execution thereby. Computing system 100 also includes memory 109 for storing the program instructions (and any related data) during execution by processing units 108 in processing cluster 102. Memory 109 comprises, in one implementation, any suitable form of random access memory (RAM) now known or later developed, such as dynamic random access memory (DRAM). In other embodiments, other types of memory are used. Further, in some exemplary implementations, each processing unit in processing cluster 102 has a separate memory 109 dedicated to storing the program instructions during execution on the associated processing unit.

In certain embodiments, when the processing unit 104 executes the instructions that comprise avionic operational data communications application 114, the executing instructions command the processing unit 104 to send data to and receive information from a human machine interface (HMI) 106 associated with airborne operational communications between the airborne operational communications application and the ground airborne operational communications peer. For example, in at least one implementation, when processing unit 104 sends data to HMI 106, HMI 106 renders the received data as a visual display to a user. Further, HMI 106 receives commands from a user, which HMI 106 transmits to processing unit 104. Processing unit 104 handles the received commands as directed by the executing avionic operational data communications application 114. In one exemplary implementation of the present embodiment, when the PED 102 is a tablet computer or other similar electronic device, HMI 106 includes a touch screen that displays avionic operational data to a user and receives user commands for transmitting the user commands to the processing unit 104.

In a further embodiment where the PED 102 is used on an aircraft, the PED 102 receives avionic operational data related to an aircraft via a network interface 108. Network interface 108 connects to an airborne server via an Ethernet cable, a wireless internet connection, a universal serial bus, a broadband communication link, or the like. By receiving avionic operational data through network interface 108, PED 102 acquires access to avionic operational data from an airborne server that is independent of cockpit displays and instrumentation. In one implementation, because the PED 102 is able to process the avionic operational data and provide operational communications independently of cockpit instrumentation, a pilot or flight crew member can use PED 102 to process avionic operational data and provide operational communications when the pilot is outside of the cockpit. One potential benefit of being able to provide operational communications independently of aircraft instrumentation is that a flight crew member can perform operational communications related tasks outside the cockpit, which allows the flight crew members to more efficiently allocate their time to critical flight tasks.

As mentioned above, avionic operational data communications application 114 is configurable to certain design requirements. The term "configurable," as used herein, refers to an avionic operational data communications application that is customized for a particular user, where the user is an aircraft/fleet operator, a conglomeration of airlines, an organization, a pilot, a flight crew, a maintenance crew, or the like. In one example that implements a configurable application, a particular aircraft or fleet operator may desire that certain avionic operational data be presented to the pilot, while other avionic operational data is transmitted to a ground server, while further data may be processed according to aircraft/fleet operator specifications. Alternatively, the configurable application can present the same avionic operational data to the pilot, aircraft/fleet operators. Avionic operational data communications application 114 is configurable to suit the particular needs of the particular operator. To imbue avionic operational data communications application 114 with configurability, PED 102 includes application configuration information 112 stored in storage medium 110. Alternatively, PED 102 includes multiple storage mediums 110 where a first storage medium 110 stores the application configuration information 112 and a second storage medium 110 stores avionic operational data communications application 114. Application configuration information 112 includes information that processing unit 104 accesses when executing avionic operational data communications application 114. For example, in one implementation, application configuration information 112 defines the format and content of uplink and downlink messages, how uplink messages are displayed, and how downlink messages are created and sent. Further, the application configuration information 112 defines what data is entered by the operator, the processing of avionic operational data, local parameter definitions, and the like. In one exemplary implementation, when processing unit 104 executes avionic operational data communications application 114, avionic operational data communications application 114 directs processing unit 104 to acquire configuration information from application configuration information 112 stored in storage medium 110. Processing unit 104 then uses the application configuration information 112 to determine how to configure avionic operational data communications application 114 for processing operational communications. For example, the processing unit 104 uses the application configuration information 112 to define the format and content of uplink and downlink messages, how uplink messages are displayed on PED 102, and how downlink messages are created and sent by PED 102. Further, the application configuration information 112 defines what data is entered by the operator, the processing of avionic operational data, local parameter definitions, and the like.

In at least the present exemplary embodiment, the application configuration information 112 is loaded into storage medium 110 on PED 102 from an external storage medium 116 that exists externally to PED 102. In at least one example, external storage medium 116 is an appropriate non-transitory storage media, such as flash or other non-volatile memory, magnetic disc drives, and/or optical disc drives. External storage medium 116 stores the application configuration information 112 in a database or a file so that multiple PEDs 102 can access external storage medium 116 to acquire the application configuration information 112. For instance, a fleet having a fleet specific configuration, stores the application configuration information 112 in external storage medium 116 that exists externally to PED 102, where external storage medium 116 is accessible by multiple PEDs 102. For example, external storage medium 116 is stored on a server that is controlled by a fleet operator. In an alternative implementation, application configuration information 112 is distributed on a disk, a USB drive, or the like for loading of the application configuration information 112 onto individual PEDs 102. For each PED 102 that executes avionic operational data communications application 114 associated with a particular fleet, the application configuration information 112 stored on external storage medium 116 is loaded into storage medium 110 on PED 102.

In certain embodiments, a configuration generation tool 118 creates the application configuration information 112 stored in external storage medium 116. Configuration generation tool 118 is a tool that is operated by the fleet or a third party user that creates application configuration information 112 that is commonly shared among multiple PEDs 102 within a fleet or other group of users. For example, a fleet uses configuration generation tool 118 such as a ground based software tool or a reconfiguration tool to create the application configuration information 112 stored in external storage medium 116. The configuration generation tool 118 defines the format and content of uplink and downlink messages, how uplink messages are displayed on PED 102, and how downlink messages are created and sent by PED 102. Further, the application configuration information 112 defines what data is entered by the operator, the processing of avionic operational data, local parameter definitions, and the like. By controlling multiple aspects of the application configuration information 112 available through external storage medium 116, the configuration generation tool 118 allows an organization to configure the processing of avionic operational data and control of operational communications through avionic operational data communications application 114 on multiple PEDs 102 for multiple aircraft in the fleet.

Figure 2:
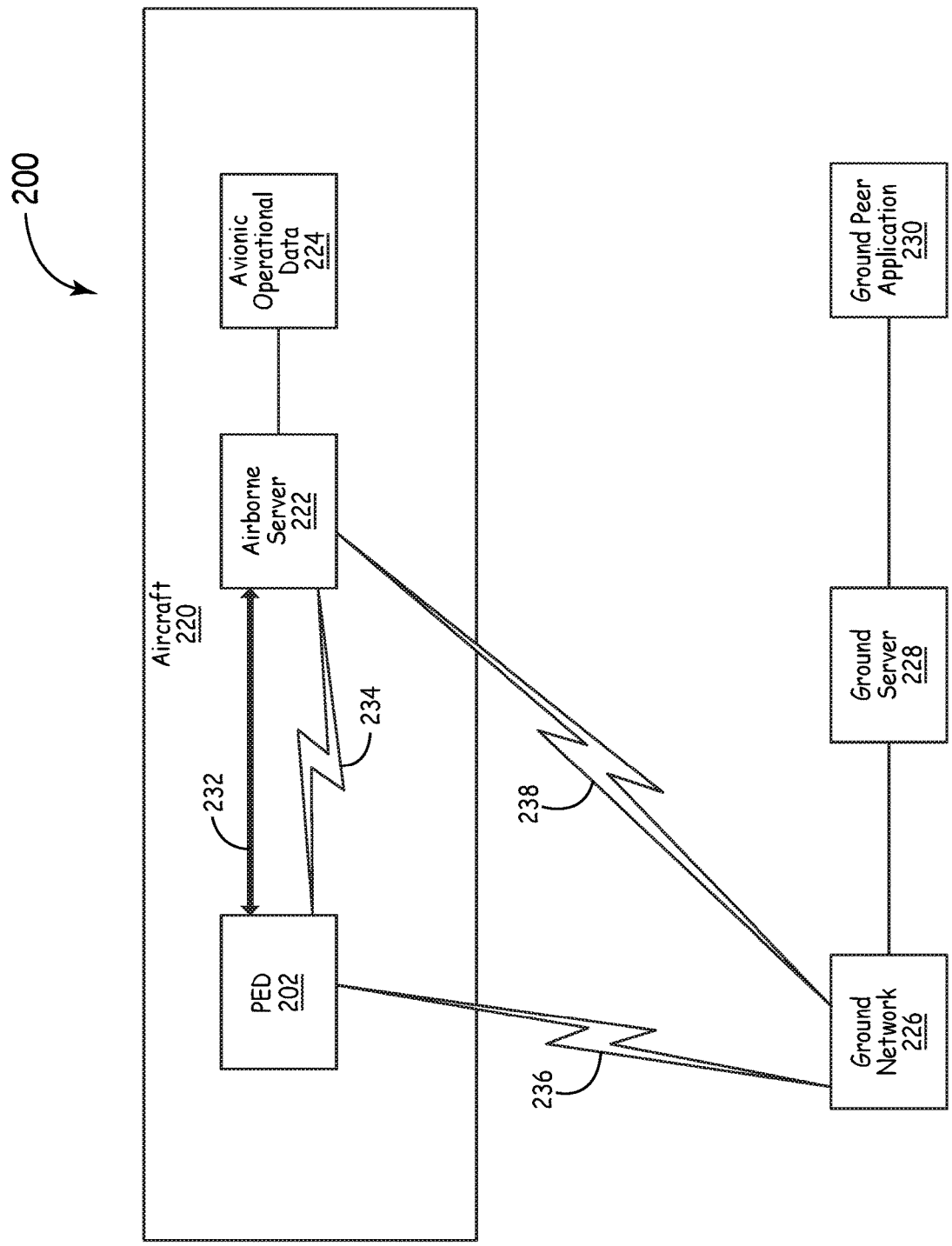
FIG. 2 is a block diagram of an exemplary embodiment of a system for communicating avionic operational data to a portable electronic device and with a ground peer application.

FIG. 2 is a block diagram illustrating a system 200 for communicating avionic operational data to a PED 202 and to a ground server 228. System 200 includes an aircraft 220 that communicates with a ground network 226. Aircraft 220 includes a PED 202 that operates similarly to PED 102 described above in relation to FIG. 1. During the operation of aircraft 220, sensors and control systems on aircraft 220 create avionic operational data 224 which is stored in a data repository on aircraft 220. Avionic operational data 224 includes information that is used by the pilots of the aircraft to monitor the status of the airplane and help operate the aircraft. Alternatively, avionic operational data 224 includes aircraft data information related to the operation of the aircraft and associated fleet. Further, ground based applications and users can use avionic operational data 224 to further track the status of the airplane and control fleet operations.

In at least one exemplary embodiment, to provide access to the avionic operational data 224, aircraft 220 includes an airborne server 222 that provides for the communication of data on aircraft 220. The airborne server 222 provides access to avionic operational data 224 and controls the transmission of information to other devices on aircraft 220. For example, airborne server 222 provides access to the information that is transmitted to cockpit devices and PED 202. In certain embodiments, airborne server 222 transmits avionic operational data 224 to PED 202. Further, PED 202 is able to transmit uplink message's operational data to airborne server 222 for distribution to other avionic devices.

In certain embodiments, PED 202 includes a processing unit 104 that processes the received avionic operational data 224 during the execution of avionic operational data communications application 114. In at least one exemplary implementation, the execution of avionic operational data communications application 114 produces data intended for transmission to a ground peer application 230 as part of a downlink. PED 202 transmits the data produced for ground peer application 230 through a network that connects to ground peer application 230. The term "ground peer application," as used herein, refers to an application that executes on a ground computer that is configured to process data that results from the execution of avionic operational data communications application 114 on PED 202 and also transmits uplink data to the PED 202 through an uplink message compatible with the defined message definition in the application configuration information stored in the storage medium and processed on the peer PED 202. In one example, PED 202 communicates produced data to ground peer application 230 with a ground network 226 through a communication link 236 between PED 202 and ground network 226. In an alternative example, PED 202 transmits the produced data to airborne server 222 over wireless connection 234 or cable connection 232. Airborne server 222 transmits data received from PED 202 that is intended for a ground peer application 230 over communication link 238 to ground network 226. In a further example, airborne server 222 receives uplink data from the ground peer application 230 over communication link 238 and ground network 226. The airborne server 222 transmits the uplink data to the PED 202. PED 202 receives the uplink data and processes the uplink data according to the application configuration information 112, which, in at least one implementation, controls the display of the uplink messages and the manner in which the uplink data is presented to an HMI. In one exemplary implementation, the processing unit 104 controlling storage medium 110 in FIG. 1 can indicate when avionic operational data is to be updated by receiving the avionic operational data from the airborne server 222. Communication links 238 includes cellular communication links, broadband SATCOM links, ACARS links (such as VHF, traditional aeronautical SATCOM, and HF), WiFi, a wired link IF on the ground, and the like.

In at least one exemplary embodiment, ground network 226 receives and transmits downlinks and uplinks which include operational data and communicates the data to a ground server 228. Ground server 228 transmits the downlink messages (which may include operational data) received from the PED 202 via the ground network 226 to a ground peer application 230. In some implementations, ground peer application 230 uses the received data from PED 202 to support organizational operations. In one exemplary implementation, ground peer application 230 receives data that represents out, off, on, and in (OOOI) times from an aircraft. An organization can use the OOOI times to determine the time in the air for a pilot when determining the earnings of the pilot.

PED 202 allows a pilot to use a readily available device with a configurable application stored thereon. The application allows the pilot to access avionic operational data 224 on PED 202. The PED 202 also transmits operational messages (including operational data) to a ground server 228 and accompanying ground peer application 230 to facilitate airline operations. In a further embodiment, PED 202 also connects to ground server 228 when PED 202 accompanies a pilot who has left aircraft 220. As the pilot is still able to communicate with ground peer application 230 through PED 202 after the aircraft has landed, the pilot is able to perform certain tasks involving avionic operational data 224 when the pilot is away from the cockpit of aircraft 220.

Figure 3:
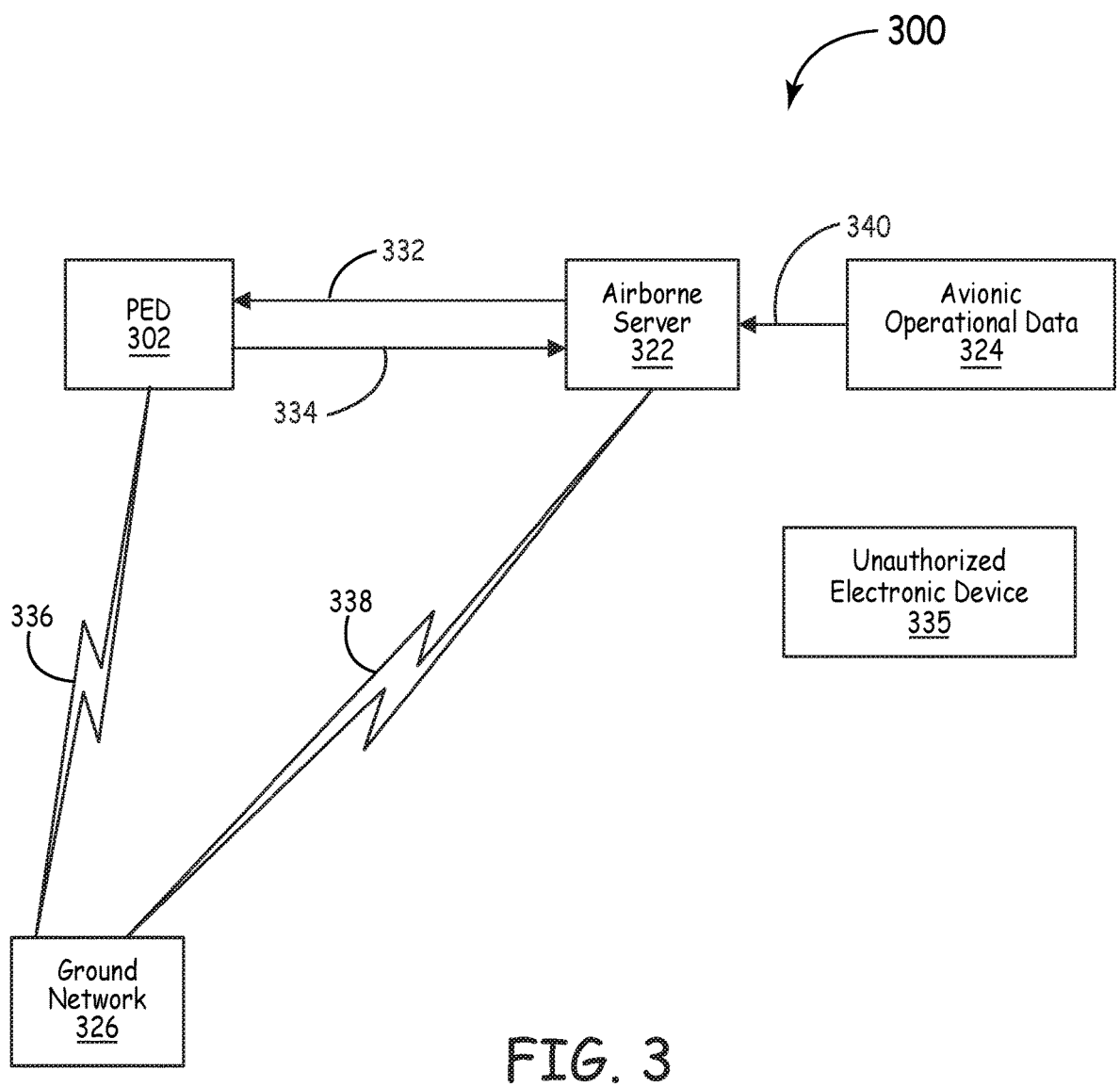
FIG. 3 is a block diagram of an exemplary embodiment of security measures for preventing electronic devices other than a designated portable electronic device from accessing the avionic operational data and the airborne operational communications.

FIG. 3 is block diagram illustrating an exemplary embodiment of security measures for preventing an unauthorized electronic device from accessing avionic operational data 324 as it is communicated to a PED 302. As discussed above, aircrafts produce avionic operational data 324 that is used by pilots of an aircraft and airlines to control flight operations. Further as discussed above, airborne server 322 receives avionic operational data 324 from systems that function on an aircraft. In at least one exemplary implementation, airborne server 322 controls the dissemination of avionic operational data 324 to electronic devices used on an aircraft, such transmitting avionic operational data 324 to PED 302. In transmitting avionic operational data 324 from aircraft systems to airborne server 322 and then onto the PED 302, security measures are used to prevent an unauthorized electronic device 335 from accessing the network.

Unauthorized electronic device 335 could attempt to affect the transmission of avionic operational data 324. For example, unauthorized electronic device 335 could attempt to access the avionic operational data 324, emulate airborne server 322 or PED 302, transmit corrupting data to PED 302, airborne server 322, and aircraft systems that produce avionic operational data 324, and the like. In the communication of avionic operational data 324, certain security measures are used to prevent unauthorized electronic device 335 from accessing the avionic operational data 324. In one example of a security measure, the communication of avionic operational data 324 to airborne server 322 over communication link 340 is unidirectional, that is avionic operational data 324 is transmitted to airborne server 322 over link 340 from the avionic systems but data is not received by the avionic systems from airborne server 322. In another example of a security measure, airborne server 322 transmits avionic operational data to PED 302 over link 332 and receives data from PED 302 over link 334, and isolates the processing of data received over link 334 from the processing of data that is transmitted over link 332. Because the received data is isolated from the transmitted data, airborne server 322 is able to limit the ability of received data from affecting the operation of an aircraft. Further, airborne server 322 verifies that PED 302 is a trusted electronic device before initiating communications with PED 302. To verify that PED 302 is a trusted electronic device, PED 302 provides an identification key or a user must login to a communication session with airborne server 322. In at least one exemplary embodiment, the PED and airborne server 322 communicate over a virtual private network, provide message authentication, and encrypt message transmissions. Similarly, PED 302 is prevented from establishing communication links with unauthorized electronic device 335. The various above mentioned security measures along with other security measures aid in preventing unauthorized electronic device 335 from accessing avionic operational data 324.

In at least one exemplary embodiment, communication link 336, between PED 302 and ground network 326, and communication link 338, between airborne server 322 and ground network 326, are subject to similar security measures described above in relation to the communication of data between airborne server 322 and PED 302. The security measures protecting ground network 326 prevent unauthorized electronic device 335 from accessing avionic operational data 324 and operational communications transmitted between an aircraft and a ground network 326.

Figure 4:
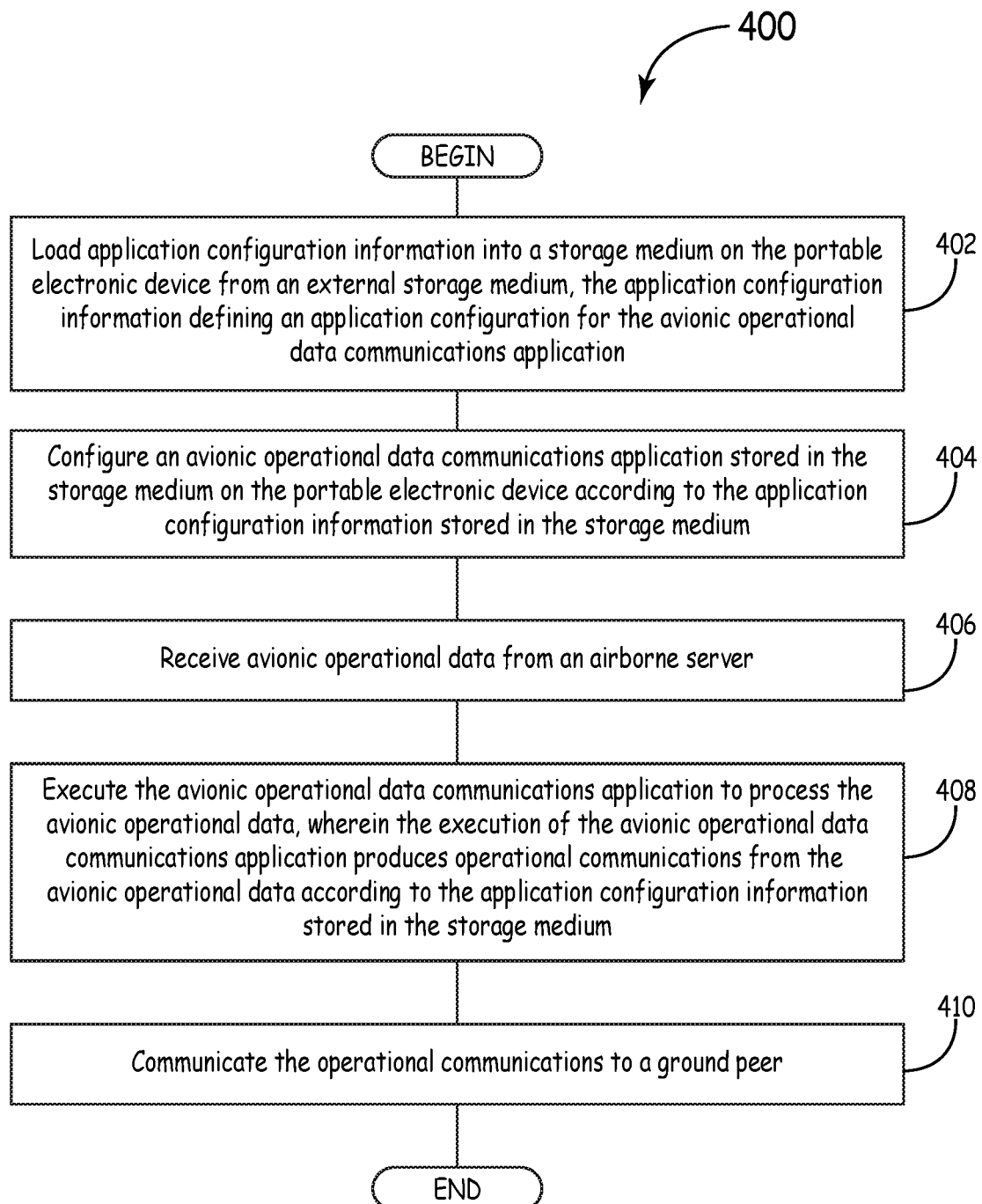
FIG. 4 is a flow diagram of an exemplary embodiment of a method for communicating avionic operational data to a programmable portable electronic device.

FIG. 4 is a flow diagram of an exemplary embodiment of a method 400 for communicating avionic operational data to a programmable portable electronic device. Method 400 begins at block 402, where application configuration information is loaded into a storage medium on the portable electronic device from an external storage medium, the application configuration information defining an application configuration for the avionic operational data communications application. For example, application configuration information is generated by a configuration generation tool and stored in an external storage medium stored externally to a PED. In some implementations, the external storage medium exists on a server that is accessible to multiple PEDs. Alternatively, the external storage medium is a portable storage medium like a floppy disk, a USB flash drive, or the like. Method 400 proceeds at block 402, where an avionic operational data communications application stored in the storage medium on the PED is configured according to the application configuration information stored in the storage medium. For example, the PED includes an avionic operational data communications application that processes avionic operational data. Further the avionic operational data communications application is configured by reading a defined configuration from the application configuration information stored in the storage medium on the PED.

Method 400 proceeds at block 406, where avionic operational data is received from an airborne server. For example, an airborne server gathers avionic operational data from aircraft systems (for example, sensors and controls on the aircraft) and provides the avionic operational data to the PED. In at least one implementation, security measures are used to prevent a non-network electronic device from accessing the avionic operational data and operational communications that are transmitted between the PED, the airborne server, and the aircraft systems. In at least one example, the airborne server only communicates with recognized PEDs.

Method 400 proceeds at block 408, where the avionic operational data communications application is executed to process the avionic operational data, wherein the execution of the avionic operational data communications application produces operational communications from the avionic operational data according to the application configuration information stored in the storage medium. For example, upon the reception of the avionic operational data from the airborne server, the avionic operational data communications application directs a processing unit on the PED to process the avionic operational data according to application configuration information stored in the storage medium. The application configuration information provides information that directs the avionic operational data communications application to produce operational communications based on the avionic operational data. For example, the application configuration information defines the format and content of uplink and downlink messages, how uplink messages are displayed, and how downlink messages are created and sent. Further, the application configuration information defines what data is entered by the operator, the processing of avionic operational data, local parameter definitions, and the like.

Method 400 proceeds at block 410, where the operational communications are communicated with a ground peer. For example, the avionic operational data communications application processes the received avionic operational data to control the operational communications, the avionic operational data communications application communicates with a ground peer to both transmit and receive operational communications. In at least one implementation, the ground peer is an application that is configured to collect the operational communications and use the collected data to control fleet operations. In certain embodiments, to communicate with the ground peer, the avionic operational data communications application on the PED communicates via an airborne server. The PED communicates directly with the airborne server, which then communicates with a ground peer through a communication link formed between the airborne server and a ground network, which connects to the ground peer. In another embodiment, the avionic operational data communications application directs the PED to directly communicate with the ground peer through the ground network using a communication link available to the PED. In another embodiment, the avionic operational data communications application directs the PED to communicate with a communication transceiver, where the communication transceiver relays operational communications between the ground peer and the PED.

Example Embodiments

Example 1 includes a communication system, the system comprising an external storage medium storing operational application configuration information defining an application configuration for an avionic operational data communications application; an airborne communication system configured to perform operational communications, the airborne communication system comprising a portable electronic device, the portable electronic device hosting the avionic operational data communications application that produces the operational communications from avionic operational data, wherein the avionic operational data communications application is configured by the application configuration information stored on the personal electronic device, wherein the application configuration information is loaded into a storage medium on the portable electronic device from the external storage medium; and an airborne server coupled to the portable electronic device, wherein the airborne server and the portable electronic device communicate operational data; and a ground communication system configured to receive the operational communications, the ground communication system comprising a ground network configured to communicate the operational communications across a communication link with the airborne server; and a ground peer application, configured to process the operational communications.

Example 2 includes the communication system of Example 1, wherein the airborne server further receives the operational communications from the portable electronic device and controls the transmission of the operational communications across the communication link.

Example 3 includes the communication system of any of Examples 1-2, wherein the portable electronic device controls communication of the operational communications across the communication link.

Example 4 includes the communication system of any of Examples 1-3 further comprising a communication transmitter for receiving operational communications from the portable electronic device and for transmitting the operational communications across the communications link.

Example 5 includes the communication system of any of Examples 1-4, wherein security measures prevent an unauthorized electronic device from accessing the avionic operational data and the operational communications.

Example 6 includes the communication system of any of Examples 1-5, wherein the external storage medium is accessed by a plurality of portable electronic devices for loading application configuration information into storage mediums on the plurality of portable electronic devices.

Example 7 includes the communication system of any of Examples 1-6, wherein the application configuration information stored in the external storage medium is generated using a configuration generation tool.

Example 8 includes the communication system of any of Examples 1-7, wherein the airborne server is a communication management unit.

Example 9 includes a portable electronic device, the device comprising a storage medium that stores application configuration information and an avionic operational data communications application, wherein the application configuration information is loaded into the storage medium from an external storage medium that stores the application configuration information defining an application configuration for the avionic operational data communications application; a network interface configured to receive and transmit the avionic operational data and operational communications; and a processing unit configured to process the received avionic operational data by executing the avionic operational data communications application as defined by the application configuration information.

Example 10 includes the portable electronic device of Example 9, wherein the network interface transmits and receives the avionic operational data and the operational communications from an airborne server.

Example 11 includes the portable electronic device of Example 10, wherein the network interface transmits the avionic operational data to the airborne server to relay the operational communications with a ground server.

Example 12 includes the portable electronic device of any of Examples 10-11, wherein the network interface communicates with the airborne server through a secure local network.

Example 13 includes the portable electronic device of any of Examples 9-12, wherein the network interface performs operational communications with a ground server.

Example 14 includes the portable electronic device of any of Examples 9-13, wherein the application configuration information stored in the external storage medium is generated using a configuration generation tool.

Example 15 includes a method for processing avionic operational data on a portable electronic device, the method comprising loading application configuration information into a storage medium on the portable electronic device from an external storage medium, the application configuration information defining an application configuration for the avionic operational data communications application; configuring an avionic operational data communications application stored in the storage medium on the portable electronic device according to the application configuration information stored in the storage medium; receiving avionic operational data from an airborne server; executing the avionic operational data communications application to process the avionic operational data, wherein the execution of the avionic operational data communications application produces operational communications from the avionic operational data according to the application configuration information stored in the storage medium; and communicating the operational communications with a ground peer.

Example 16 includes the method of Example 15, further comprising generating the application configuration information using a configuration generation tool.

Example 17 includes the method of Example 16, wherein communicating the avionic operational data with a ground peer comprises communicating with the ground peer through an airborne server, wherein the airborne server forms a communication link with the ground peer.

Example 18 includes the method of any of Examples 16-17, wherein communicating with a ground peer directly through a communication link.

Example 19 includes the method of any of Examples 15-18, further comprising preventing an unauthorized electronic device from accessing the avionic operational data and the operational communications.

Example 20 includes the method of any of Examples 15-19, further comprising generating the application configuration information with a configuration generation tool.

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

What is claimed is:

1. A system for preventing unauthorized access to operational aircraft data, the system comprising:
a server configured to be positioned on an aircraft, the server configured to:

communicate with a portable electronic device and a plurality of aircraft systems, wherein the server is configured to unidirectionally communicate with the plurality of aircraft systems, wherein the server is configured to receive avionic operational data from the plurality of aircraft systems;

implement security measures to prevent unauthorized electronic devices from accessing the avionic operational data produced by the plurality of aircraft systems; and control dissemination of avionic operational data to electronic devices.

2. The system of claim 1, wherein the server is configured to isolate communication between the server and the portable electronic device from communication between the server and the plurality of aircraft systems.

3. The system of claim 1, wherein the server is configured to verify that the portable electronic device is trusted before initiating communication with the portable electronic device.

4. The system of claim 3, wherein the server is configured to determine whether the portable electronic device is trusted by receiving an identification key from the portable electronic device.

5. The system of claim 3, wherein the server is configured to determine whether the portable electronic device is trusted through a user log in via the portable electronic device.

6. The system of claim 1, wherein the server is configured to communicate with the portable electronic device over at least one wired connection.

7. The system of claim 1, wherein the server is configured to communicate with the portable electronic device over at least one wireless connection.

8. The system of claim 1, wherein the server is configured to prevent the portable electronic device from establishing communication links with unauthorized electronic devices.

9. The system of claim 1, wherein the server is further configured to:
receive produced data from the portable electronic device; and
transmit the produced data from the portable electronic device to a ground server.

10. The system of claim 1, wherein the server is further configured to:
receive uplink data from a ground server; and
transmit the uplink data from the ground server to the portable electronic device.

11. A method for preventing unauthorized access to operational aircraft data performed by a server configured to be positioned on an aircraft, the method comprising:
communicating with a portable electronic device and a plurality of aircraft systems, wherein the server is configured to unidirectionally communicate with the plurality of aircraft systems, wherein the server is configured to receive avionic operational data from the plurality of aircraft systems;
implementing security measures to prevent unauthorized electronic devices from accessing the avionic operational data produced by the plurality of aircraft systems; and
controlling dissemination of avionic operational data to electronic devices.

12. The method of claim 11, further comprising isolating communication between the server and the portable electronic device from communication between the server and the plurality of aircraft systems.

13. The method of claim 11, further comprising verifying that the portable electronic device is trusted before initiating communication with the portable electronic device.

14. The method of claim 13, wherein verifying that the portable electronic device is trusted includes receiving an identification key from the portable electronic device.

15. The method of claim 13, wherein verifying that the portable electronic device is trusted includes a user logging in through the portable electronic device.

16. The method of claim 11, wherein the server is configured to communicate with the portable electronic device over at least one wired connection.

17. The method of claim 11, wherein the server is configured to communicate with the portable electronic device over at least one wireless connection.

18. The method of claim 11, further comprising preventing the portable electronic device from establishing communication links with unauthorized electronic devices.

19. The method of claim 11, further comprising:
receiving produced data from the portable electronic device; and
transmitting the produced data from the portable electronic device to a ground server.

20. The method of claim 11, further comprising:
receiving uplink data from a ground server; and
transmitting the uplink data from the ground server to the portable electronic device.

* * * * *